Feb. 20, 1962     C. R. BAKER ET AL     3,021,682

PROCESS AND APPARATUS FOR PURIFYING LOW BOILING GASES

Filed Oct. 12, 1960     2 Sheets-Sheet 1

INVENTORS
CHARLES R. BAKER
RICHARD S. PAUL

BY William F. Mesinger
ATTORNEY

Feb. 20, 1962 C. R. BAKER ET AL 3,021,682
PROCESS AND APPARATUS FOR PURIFYING LOW BOILING GASES
Filed Oct. 12, 1960 2 Sheets-Sheet 2
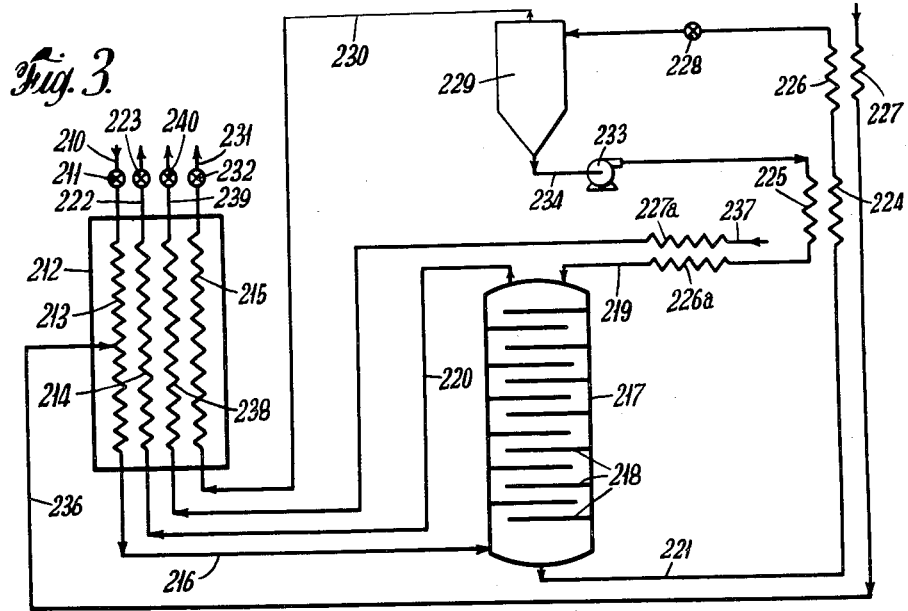
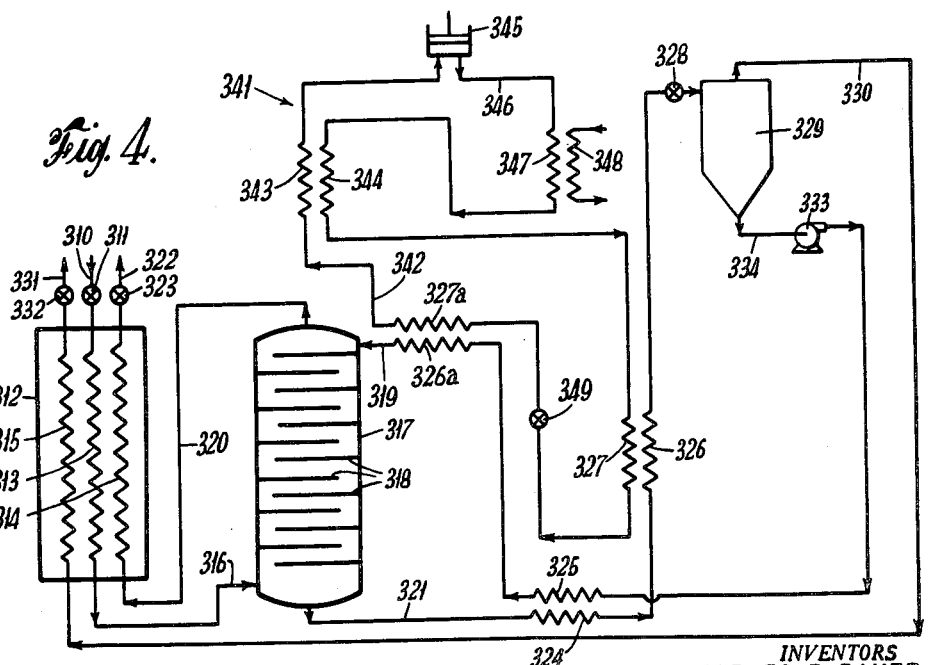
INVENTORS
CHARLES R. BAKER
RICHARD S. PAUL
BY William F. Mesinger
ATTORNEY United States Patent Office 3,021,682
Patented Feb. 20, 1962

3,021,682
PROCESS AND APPARATUS FOR PURIFYING LOW BOILING GASES
Charles R. Baker, Kenmore, and Richard S. Paul, Grand Island, N.Y., assignors to Union Carbide Corporation, a corporation of New York
Filed Oct. 12, 1960, Ser. No. 62,158
26 Claims. (Cl. 62—17)

This invention relates to an improved system for purifying low boiling gases, and more particularly to improved process and apparatus for the low-temperature separation of nitrogen from compressed gaseous fluids having a major constituent boiling below about −245° C. such as helium, hydrogen and neon.

A convenient source of hydrogen for metallurgical purposes is the partial oxidation of fuels such as natural gas and oil, followed by the so-called "water gas shift" process. The latter converts most of the carbon monoxide produced by the partial oxidation into carbon dioxide with the simultaneous release of additional hydrogen. The gaseous crude hydrogen obtained by such methods contains carbon monoxide, carbon dioxide, methane, nitrogen, and argon impurities; however, it has been found that the efficiency of certain metallurgical processes such as direct reduction of iron ore is substantially improved if such contaminants are removed. It has been proposed to partially accomplish this purification by cooling the crude hydrogen sufficiently so that the higher boiling impurities, e.g., carbon dioxide, are condensed, and then washing the lower boiling impurity-containing hydrogen with a liquid solvent such as nitrogen, methane, or propane, at moderately low temperatures, e.g., −170° C. or warmer, so that a portion of the lower boiling impurities are absorbed therein. This purification method has several important limitations and disadvantages: For example, nitrogen or methane contamination of a hydrogen product is unavoidable if either is used as the washing liquid. If propane is used, the solubility of the lower boiling impurities in the wash liquid at −170° C. is not sufficiently high for substantially complete removal of such impurities. In order to obtain pure hydrogen economically with any of these systems, additional purification steps must be employed using separate and expensive means.

A convenient source of helium is available from natural gas fields. Unfortunately, the percentage of helium present in gas streams from these fields is very low. The constituents of such a field normally include methane, nitrogen, a small percentage of high boiling hydrocarbons, the remainder being helium. The helium percentage from these fields ranges from about 1.5 to 3.0 percent. The removal of the hydrocarbons is readily accomplished by well-known and efficient methods. The removal of nitrogen from the helium stream to provide a helium purity of 99.0% is very difficult. A process, similar to the one previously discussed for hydrogen, has been proposed but the limitations and disadvantages remain the same.

A principal object of the present invention is to provide a process of and apparatus for substantially complete removal of a nitrogen impurity from gaseous fluids having a major constituent boiling below about −245° C., such as helium, neon and hydrogen.

Another object of the present invention is to provide a process of and apparatus for substantially complete removal of a lower boiling impurity such as nitrogen from low boiling gaseous fluids in a single washing step and in a single wash column apparatus.

A still further object of the present invention is to provide a highly efficient and economical process of and apparatus for washing crude low boiling gas streams with a liquid solvent at such conditions of pressure and temperature as to effect substantially complete removal of nitrogen.

A still further object of the present invention is to provide a highly efficient and economical process of and apparatus for washing crude hydrogen with a liquid solvent at such conditions of pressure and temperature as to effect substantially complete removal of lower boiling impurities including nitrogen and carbon monoxide.

These and other objects and advantages of this invention will be apparent from the following description and accompanying drawings in which:

FIGURE 3 is a flow diagram of a system similar to that of FIGURE 1, but modified to include externally supplied refrigeration; and FIGURE 4 is a flow diagram of a still further modification of the FIGURE 1 embodiment in which a closed circuit refrigeration system is provided.

Figure 1:
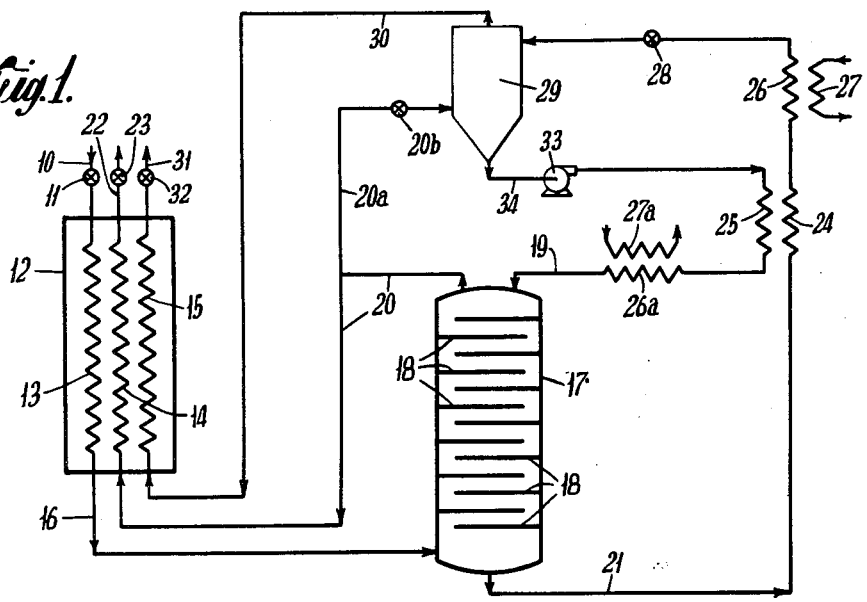
FIGURE 1 is a flow diagram of an exemplary system for purifying low boiling gaseous fluids, according to the present invention.

According to the present invention, a feed stream having a major gaseous constituent boiling below about −245° C. and containing minor amounts of nitrogen and carbon monoxide as an intimate mixture or just nitrogen is provided at a convenient working pressure and a low temperature preferably below −180° C. The cold feed stream is washed with a substantially subcooled wash liquid which at the washing conditions has a vapor pressure less than approximately one-five hundredths of the vapor pressure of the most volatile impurity, nitrogen (measured in pure form), to be removed from the product gas. In this manner, the lower boiling impurities are transferred to wash liquid by absorption therein, and a gaseous product of at least 99.0% purity is readily recoverable from the washing step. The lower boiling impurities are removed from the contaminated wash liquid prior to recycling such liquid for re-use in the washing step. The lower-boiling impurities are preferably removed by rewarming and throttling the wash liquid to a lower pressure so as to evaporate and substantially desorb such impurities. Since the purity of the gaseous product is dependent on the cleanliness of the wash liquid, an even higher purity gaseous product, e.g., 99.9%, may be obtained by stripping the remaining impurities from the wash liquid in addition to the aforementioned rewarming and throttling steps, thereby providing an even cleaner wash liquid for re-use. The feed stream may be initially cooled from ambient temperature to the low temperature in a heat exchange zone by, for example, heat exchange with the gaseous product. Also, the refrigeration of the cold lower boiling impurity stream from the desorption step may be recovered by passage through the heat exchange zone to aid in cooling the feed stream. If the latter contains residual higher boiling impurities such as water and carbon dioxide, they may be removed by cooling the feed stream in the heat exchange zone to a temperature below their condensation points. Additional refrigeration for operating the wash column at the desired low temperature may be obtained by several methods: For example, work expanding the washed product gaseous product effluent, providing a cold liquid such as liquid nitrogen from an external source, or utilizing a closed refrigeration circuit.

The wash liquid preferably comprises at least one 2- or 3-carbon aliphatic hydrocarbon such as ethane, propane, or propylene. It is essential to this invention that such wash liquid be subcooled to a temperature very near its freezing point. For example, if propane is used, it should be cooled to between —180° C. and —186° C. since it freezes at approximately —187° C. In this low temperature range, propane and similar light hydrocarbons have negligible vapor pressures and the gaseous product is not noticeably contaminated with wash liquid vapors as a result of the washing operation. Also, the dissolved lower boiling impurities may be readily removed from a deeply subcooled wash liquid by partially rewarming and throttling such liquid to a lower pressure with very small evaporative loss. For example, if hydrogen is the major constituent and the propane wash liquid is rewarmed to about —120° C. and throttled to about atmospheric pressure, the evaporative loss will be very low since the liquid is still deeply subcooled. If helium is the major constituent the propane wash liquid is preferably rewarmed to its boiling point (—42° C.). The impurities are stripped from the liquid by vaporizing a small part of the wash liquid. The vaporized wash liquid may be recovered by heat exchange.

$C_2$ and $C_3$ aliphatic hydrocarbons have formerly been used as wash liquids at relatively high temperatures where their performance is readily predictable and in applications where contamination of the gaseous product by the washing fluid is either tolerated or not objectionable. However, as their temperatures are reduced to within the required operating range of the present invention, their behavior as absorbents become nonideal and thus depart widely from values predicted by usual methods of calculation assuming ideal solutions. This adverse behavior has resulted in such liquids being disregarded as suitable wash liquids at temperatures approching their freezing points. Contrary to this conclusion, it has been found that $C_2$ and $C_3$ aliphatics and particularly certain mixtures thereof exhibit improved solvent characteristics near their freezing points and provide an efficient, and economical method of removing low boiling impurities such as carbon monoxide and nitrogen from gaseous crudes having a major constituent boiling below about —245° C.

The aforementioned limitations of nitrogen, methane, or propane wash systems operated at relatively warm temperatures are shown quite clearly in Table I which compares several washing systems for hydrogen purification. One basis used in comparing the wash systems is the ratio of the wash liquid recirculation rate to the vapor rate $(L/V)$. In a low temperature process of this type, the wash liquid recirculation rate largely determines the refrigeration requirements and power costs of the process. Another basis of comparison is the contamination of the hydrogen product with vapors from the wash liquid. The degree of contamination is dependent upon the vapor pressure exerted by the wash liquid at the conditions maintained in the wash column.

TABLE I

*Preliminary comparison of various single step wash systems at 20 atm. abs.*

| Wash Liquid | T, ° C. | L/V | Product Contamination with Wash (Mol percent) |
|---|---|---|---|
| Nitrogen | —195 | 0.15 | 10 (nitrogen). |
| Methane | —180 | 0.9 | 1.5 (methane). |
| Propane | —168 | 6.8 | nil. |
| Propane | —184 | 2.9 | nil. |
| Propane (50%) + Propylene (50%) | —192 | 1.4 | nil. |
| Ethane (50%) + Propane (50%) | —192 | 1.1 | nil. |

With reference to Table I, nitrogen is seen to be an effective wash liquid for carbon monoxide removal, requiring a recirculation of only about 0.15 mol of wash liquid for each mol of hydrogen product. However, nitrogen vapor contaminates the hydrogen product to the extent of about 10 mol percent, and the removal of carbon monoxide is accomplished only at the expense of a considerable loss in overall product purity. Similarly, methane is effective in removing carbon monoxide, but also contaminates the product to the extent of about 1.5 mol percent with methane vapors. It is clear that this imposes a severe and undesirable limit on the degree of hydrogen purity which can be obtained with a methane wash. Propane cooled to moderately low temperatures (e.g., —170° C.) has a very low vapor pressure and does not contaminate the product with its vapors. However, it is found that nitrogen exhibits poor solubility in propane at these conditions and, therefore, requires an unreasonably high wash recirculation rate for the substantially complete removal of this impurity.

In spite of the apparent unsuitability of wash liquids such as propane for gas purification, we have further explored the low temperature range and have found unexpected advantages to exist when operating the process at temperatures approaching the freezing point of such liquids. Table I shows that the recirculation rate required for the removal of carbon monoxide with a propane wash improves more than twofold when the temperature is reduced to —184° C. Thus, there is obtained an economic process which in a single step achieves the removal of low boiling impurities from hydrogen, or any other gas stream having a major constituent boiling below about —245° C., without recontamination of the product with wash vapors. Still further improvement may be obtained by the use of mixtures of $C_2$ and $C_3$ aliphatic liquids, an excellent example being a mixture of equal parts ethane and propane. The latter wash liquid at a temperature of —192° C. requires a recirculation rate less than one-sixth of that required for propane at —168° C. One reason for the improved performance of such mixtures is that they exhibit depressed freezing points and when properly proportioned allow operation at temperatures lower than permitted with any single component. For example, the lowest practical operating temperatures for pure ethane and propane are about —180° and —186° C., respectively, while a 50%-50% mixture may be safely operated at —192° C. without freezing.

The removal of nitrogen will require recirculation rates somewhat higher than the removal of carbon monoxide. Nevertheless, advantages similar to those shown in Table I for carbon monoxide would be observed in the wash recirculation rates required for the substantially complete removal of nitrogen.

When pure oxygen is used for hydrogen production, the crude hydrogen will normally contain only small amounts of nitrogen. If the hydrogen is obtained by the partial oxidation of a relatively nitrogen-free fuel such as oil, then the hydrogen crude may contain only about 0.07% nitrogen. Hydrogen crudes obtained by partial oxidation of certain natural gases will contain larger amounts of nitrogen; e.g., 0.70%, and the most efficient wash liquid available should be employed if an appreciable amount of this impurity must be removed.

It has been found that when nitrogen is present in crude hydrogen in considerable amounts, its substantially complete removal will be greatly facilitated by the presence of ethane in the wash liquid. The outstanding performance of a 50% ethane-50% propane wash liquid operating at —192° C. is illustrated in Table II. This table shows typical analyses of a crude hydrogen feed containing substantial amounts of nitrogen and of a product obtainable by a single-step propane-ethane wash process. The results were obtained using a recirculation rate of approximately 2.3 mols of wash liquid per mol of hydrogen product.

TABLE II

*Impurity removal using ethane-propane wash*

| | Feed (Mol-percent) | Product (Mol-percent) |
|---|---|---|
| Hydrogen | 96.65 | 99.79 |
| Nitrogen | 0.7 | 0.16 |
| Carbon Monoxide | 2.0 | 0.04 |
| Argon | 0.25 | 0.005 |
| Methane | 0.4 | 0.005 |

Referring now to the drawings and particularly to FIGURE 1, a crude feed gas having a major constituent boiling below about −245° C. is supplied at approximately ambient temperature and a substantial working pressure which may be selected according to a desired delivery pressure of the purified gaseous product or alternatively at a convenient pressure for the washing process such as below about 625 p.s.i.g. and preferably about 300 to 400 p.s.i.g. Such feed gas at say 300 p.s.i.g., is supplied to conduit 10, and is passed through inlet valve 11 to the heat exchange zone 12 where it is cooled to a low temperature below −180° C., e.g. −185° C. The crude gas stream may have been previously processed to remove substantially all of the higher boiling impurities such as water and carbon dioxide, any remaining higher boiling impurities being removed by deposition in the feed gas passageway 13 within the heat exchange zone 12. Such deposited impurities may be periodically removed by taking the heat exchange zone out of service and purging passageway 13 by means not illustrated. The feed gas is cooled by heat exchange with the washed gaseous product in passageway 14, and a stream of desorbed lower boiling impurities in passageway 15, to be described later. The cold gaseous product free of higher boiling impurities is discharged from zone 13 through conduit 16, and passed to the bottom of wash column 17 which may include a series of superimposed sieve-type trays 18. The cold product gas rises through the column in countercurrent flow to the wash liquid which is introduced at the top of column 17 through conduit 19.

As previously discussed, the wash liquid must be substantially subcooled to a temperature approaching its freezing point, and at these conditions should also have a negligible vapor pressure. In regard to this vapor pressure requirement, a good measure of the suitability of a wash liquid is the ratio of its vapor pressure to that of the most volatile contaminant in pure form which must be removed, both vapor pressures being measured at the washing temperature. This ratio should be on the order of 1 to 500. The basis for this requirement is as follows: When a high purity product is sought in which the maximum permissible concentration of any single impurity is measured in hundredths of a percent, then the maximum permissible contamination of the product by the wash vapors should be on the same order of magnitude or less. Obviously, little would be accomplished by the removal of several hundredths percent of an impurity from the crude gas stream if an equal or greater amount of contamination is introduced from the wash vapors.

The washed product gas effluent is discharged through conduit 20 at the top of wash column 17, and substantially all of the lower boiling impurities such as methane, nitrogen, argon, and carbon monoxide are eliminated from such product gas and contained in the impurity-rich wash liquid discharged from the bottom of the column through conduit 21.

It is apparent from the hydrogen product analysis shown in Table II that the washing step of the present invention does not produce contamination of the product hydrogen by the wash liquid.

The refrigeration of the product gas in conduit 20 is recovered by countercurrent heat exchange in passageway 14 with the crude feed gas in passageway 13 of heat exchange zone 12. The warmed product gas is discharged from such zone 12 through conduit 22 and regulating valve 23 therein, for further processing as desired.

The lower boiling impurity-containing wash liquid in conduit 21 is cleaned for subsequent recycling to the wash column 17 and treatment of incoming cold crude gas stream therein. This cleaning is preferably accomplished by first partially warming the impurity-rich wash liquid in passageway 24 by heat exchange with cleaned higher pressure wash liquid in passageway 25, and then further rewarming such partially warmed, subcooled wash liquid in passageway 26 by heat exchange with a warmer fluid in passageway 27. A uniform temperature heat source is preferred for passageway 27 to maintain the wash liquid at a consistent warm temperature in the desorption step. By these two heating steps the impurity-rich propane wash liquid is warmed from approximately −185° C. to about −120° C. Next, the liquid is throttled through valve 28 from about the wash column operating pressure of 300 p.s.i.g. to a lower pressure, e.g. 6 p.s.i.g., and passed through conduit 21 into the separator 29. By throttling, the low boiling impurities are evaporated from the wash liquid, and are discharged from the separator 29 through conduit 30 as a lower boiling impurity stream. The vapor pressure of the wash liquid of course increases due to the warming step, but the evaporative loss after throttling is very small since the liquid is still deeply subcooled.

The gas product purity attainable is dependent on the cleanliness of the wash liquid, and consequently on the effectiveness of the aforedescribed wash liquid cleaning method. A product purity in the range of 99.0–99.5% is readily attainable using the warming-throttling procedure; but if a higher product purity, e.g. 99.9% is desired, the wash liquid may be additionally stripped of substantially all of the remaining lower boiling impurities by diverting a small part of the product gas from conduit 20 to conduit 20a, and through regulating valve 20b to the base of separator 29. The product stripping gas then rises through separator 29 in intimate contact with the descending wash liquid and facilitates removal of the remaining lower boiling impurities. Liquid gas contact means, such as reactification trays (not shown) may be provided in the separator 29, if desired. The contaminated stripping gas is discharged through conduit 30 along with the evaporated lower boiling impurities.

When helium is the major constituent in the product gas stream it may not be deemed economical to divert a small part of the product gas for use as a stripping gas. High purity helium may however be obtained by warming the impurity-rich wash liquid to a warmer temperature than discussed earlier (−120° C.), e.g. about −42° C. in passageway 24. The liquid throttled through valve 28 from about the wash column operating pressure of 300 p.s.i.g. to a lower pressure, e.g. 6 p.s.i.g. and passed into the separator 29. The impurities are evaporated from the wash liquid and are discharged from the separator 29 through conduit 30 as a lower boiling impurity stream. A combination of raising the temperature of the wash liquid and using the helium product as a stripping gas is also advantageous. The lower boiling impurity stream leaving the separator 29 through conduit 30 could be separated by means not illustrated, such as a distillation column, the pure gaseous helium distillate formed could then be recombined with the major product gas stream.

The lower boiling impurity stream (and the stripping gas, if used) in conduit 30 is conducted to passageway 15 in heat exchange zone 12 where it passes in countercurrent heat exchange with, and transfers its refrigeration to the crude feed gas stream in passageway 13. The warmed impurity stream emerges from the warm end of zone 12 through conduit 31 and regulating valve 32 therein, and may be further processed as desired. The cleaned or lean wash liquid is withdrawn from the bottom of separator 29 by pump 33 in conduit 34 and partially recooled in passageway 25 by heat exchange with subcooled impurity-containing wash liquid in passageway 24. The partially recooled clean wash liquid is then further recooled to the washing temperature in passageway 26a by heat exchange with a refrigerant in passageway 27a, and recycled by conduit 19 to the top of the wash column 17 for re-use in the cold washing step. By operating a 50% propane–50% ethane wash under the previously set forth conditions, the hydrogen product purity shown in Table II may be obtained by recirculating approximately 230 mols of wash liquid for each 100 mols of crude hydrogen processed. About 96.5 mols of product hydrogen are obtained, and the remaining 3.5 mols constitute the lower boiling impurity stream.

It can be seen from the foregoing description that the present invention provides a highly efficient and economical process and apparatus for substantially complete removal of nitrogen from gaseous fluids having a major constituent boiling below about −245° C. Furthermore, this impurity removal is achieved in one washing step whereas the heretofore-known systems have either failed completely to accomplish this purpose, or required at least one cleanup step in addition to a washing step.

A low-temperature source of refrigeration must be provided at the washing column temperature level. In FIGURE 1, a refrigerant is introduced to passageway 27a in order to cool the recycling cleaned wash liquid, and the product gas is provided at approximately the operating pressure of the wash column. If the product gas may be delivered to the consumption point at a pressure substantially lower than that of the wash column, all or part of the product may be work expanded for refrigeration.

Figure 2:
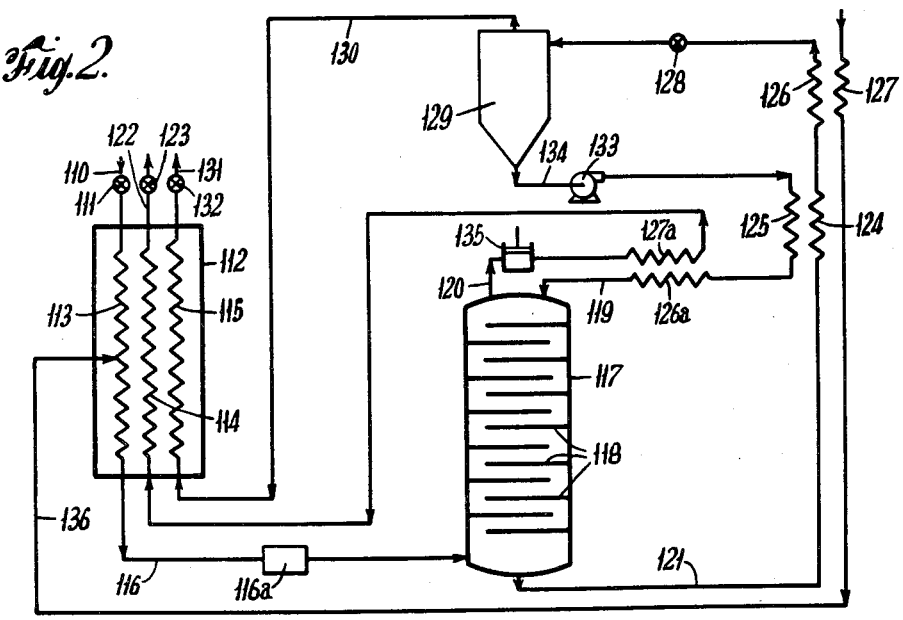
FIGURE 2 is a flow diagram of a system similar to that of FIGURE 1, but modified to include work expansion of the washed gas product effluent.

Referring now to the embodiment illustrated in FIGURE 2, the components which are similar to those shown in FIGURE 1 are designated by similar reference numerals. Crude feed gas having a major constituent boiling below about −245° C. at about 400 p.s.i.g. is cooled in passageway 113 and any residual higher boiling impurities are removed in adsorption trap 116a prior to washing in wash column 117. The product gas effluent is discharged through conduit 120 at the top of the column 117, and expanded through expander 135 to a lower pressure, e.g. 125 p.s.i.g., with the production of external work. The expanded product gas is conducted through passageway 127a to recool the recycling cleaned wash liquid in passageway 126a. The partially warmed lower pressure product gas is then conducted through passageway 114 of heat exchange zone so that the remainder of its sensible refrigeration may be recovered by crude feed gas in passageway 113. Thus, it can be seen that this embodiment of the present invention provides a method of supplying low-temperature refrigeration for the washing step by work expansion of the product gas effluent, while still permitting delivery of this stream at substantial pressure for subsequent processing as desired.

Another distinguishing feature of the modification of FIGURE 2 is the auxiliary stream of crude gas which is supplied to conduit 136 at the same conditions as the main crude feed stream in conduit 110 (ambient temperature and about 400 p.s.i.g.), and partially cooled in passageway 127 by heat exchange with the lower boiling impurity-containing wash liquid in passageway 126. The partially cooled auxiliary crude gas stream is then introduced into the main crude gas stream in passageway 113 of heat exchange zone 112 at approximately the same intermediate temperature level as the temperature of the auxiliary stream, and is processed as part of the main gas stream. The auxiliary stream thus provides a steady source of heat to facilitate cleaning of the impurity-containing wash liquid, and this is particularly desirable for stability of operation. It should be noted that use of the auxiliary stream is particularly advantageous when the concentration of higher boiling impurities in the crude gas stream is relatively low, so as to avoid excessive deposition of such impurities in passageway 127 and conduit 136.

When the gaseous product is desired at essentially the same pressure as the crude feed gas, work expansion of the gaseous product is less attractive since recompression of the product will entail additional investment and power costs. Liquid nitrogen then becomes an economical source of low-temperature refrigeration, particularly if an air separation plant with adequate refrigeration capacity is close at hand.

Referring now to the FIGURE 3 embodiment of the present invention, externally supplied liquid nitrogen is introduced through conduit 237 and is conducted to passageway 227a when it recools the recycling cleaned wash liquid in passageway 226a. The liquid nitrogen is simultaneously vaporized in passageway 227a and directed through conduit 237 to passageway 238 where it aids in cooling the crude gas feed stream in passageway 213. The warmed gaseous nitrogen is discharged from the warm end of zone 212 through conduit 239 and control valve 240 therein for further processing as desired. It will be noted that the auxiliary crude gas stream described in conjunction with FIGURE 2 is also used in FIGURE 3, and that the latter embodiment of the invention is in all other respects similar to FIGURE 1.

FIGURE 4 illustrates another embodiment of the present invention wherein low-temperature refrigeration is provided by a closed circuit nitrogen refrigeration system. This cycle is similar to the FIGURE 3 embodiment in that both provide low-temperature refrigeration for the washing step without requiring work expansion of the product gas. Also, both cycles provide product gas at substantially the same pressure as that of the washing step.

Referring now to FIGURE 4, the crude feed gas having a major constituent boiling below about −245° C. is cooled in passageway 313 of heat exchange zone 312 by the product gas and the lower boiling impurity stream in passageways 314 and 315, respectively, and then washed in wash column 317. The impurity-containing wash liquid is partially warmed in passageway 324, and simultaneously partially recools the cleaned wash liquid in passageway 325. The partially warmed but still subcooled wash liquid is further warmed in passageway 326 by heat exchange with cold nitrogen gas in passageway 327 from the closed refrigeration circuit 341, and then throttled through valve 328 into the separator 329. The cleaned wash liquid is withdrawn from the bottom of separator 329 through conduit 334 by pump 333, partially recooled in passageway 325, and further recooled in passageway 326a by heat exchange with low pressure liquid nitrogen in passageway 327a. The further recooled and substantially subcooled wash liquid is then returned to the wash column through conduit 319 for treatment of incoming gaseous crude.

The closed refrigeration circuit 341 may be provided with any suitable refrigerant such as nitrogen. This circuit consists of a refrigerant compressor, a throttling valve, and suitable heat exchange means, and operates as follows: The gaseous nitrogen emerging from passageway 327a into conduit 342 at about 13 p.s.i.g. and −190° C. is rewarmed to about 15° C. in passageway 343 by heat exchange with recooling recompressed gaseous nitrogen in passageway 344, and recompressed in compressor 345 to a second higher pressure, for example 2200 p.s.i.g. The recompressed gaseous nitrogen is discharged into conduit 346, after cooled in passageway 347 by water circulating through passageway 348, and partially recooled to about −113° C. in passageway 344 by the low pressure gaseous nitrogen in passageway 343. The partially recooled nitrogen is then further recooled to about −130° C. in passageway 327 by partially warmed impurity-containing wash liquid in passageway 326, cooled to about −190° C., and partially condensed by throttle-expansion through valve 349 to a low pressure, for example, 13 p.s.i.g., and conducted through passageway 327a for vaporization.

As previously discussed, the addition of certain light-weight hydrocarbons to liquid propane provides unexpected improvement in the physical characteristics of such liquid when used as a washing medium at temperatures approaching its freezing point. These additives, when properly proportioned, permit the use of a lower washing temperature which results in higher solubility of the lower-boiling impurities and more favorable equilibrium conditions. Among the additives which have been found to improve the performance of propane are propylene, and ethane. Also, the use of ethane in the wash liquid has been found to be an effective method of removing substantially all of the nitrogen present in crude hydrogen, ethane-propane, and ethane-propylene mixtures being particularly suitable for relatively high nitrogen-content crude hydrogen feeds. In the case of the hydrocarbon mixture wash liquid, the wash column operating temperature is preferably below the freezing point of any of the individual components, as illustrated by the following table:

TABLE III

*Hydrocarbon mixture wash liquids*

| Wash liquid: | Preferable washing temperature, °C. |
|---|---|
| Propane-propylene | Below −187 |
| Propane-ethane | Below −187 |
| Propylene-ethane | Below −185 |
| Ethane-ethylene | Below −180 |

Although the preferred embodiments have been described in detail, it is contemplated that modifications of the process and the apparatus may be made and that some features may be employed without others, all within the spirit and scope of the invention as set forth herein.

This is a continuation-in-part of copending application, Serial No. 682,510 filed September 6, 1957, in the names of Charles R. Baker and Richard S. Paul.

What is claimed is:

1. A process for the low-temperature separation of nitrogen lower boiling impurity from a gas mixture having a major constituent boiling below about −245° C. including the steps of providing a feed stream including the major constituent and containing minor amounts of such lower boiling impurity at a substantial working pressure and a low temperature below −180° C.; providing a subcooled wash liquid at about said low temperature and said working pressure, such liquid having a vapor pressure less than approximately one five-hundredths of the vapor pressure of nitrogen at such temperature; washing the cold gaseous feed stream with the wash liquid thereby transferring substantially all of the nitrogen lower boiling impurity to the wash liquid by absorption therein; removing the lower boiling impurity from the contaminated wash liquid and recycling such cleaned wash liquid for re-use in the washing step.

2. A process according to claim 1 wherein said major constituent is helium.

3. A process according to claim 1 wherein said major constituent is neon.

4. A process according to claim 1 wherein said major constituent is hydrogen.

5. A process for the low-temperature separation of nitrogen and carbon monoxide lower boiling impurities from gaseous crude hydrogen including the steps of providing a feed stream of mainly hydrogen and containing minor amounts of such lower boiling impurities at a substantial working pressure and a low temperature below −180° C.; providing a subcooled wash liquid at about said low temperature and said working pressure, such liquid having a vapor pressure less than approximately one five-hundredths of the vapor pressure of nitrogen at such temperature; washing the cold hydrogen feed stream with the wash liquid thereby transferring substantially all of the nitrogen and carbon monoxide lower boiling impurities to the wash liquid by absorption therein; removing the lower boiling impurities from the contaminated wash liquid and recycling such cleaned wash liquid for re-use in the washing step.

6. A process for the low-temperature separation of nitrogen lower boiling impurity from a gas mixture having a major constituent boiling below about −245° C. including the steps of providing a feed stream including the major constituent and containing minor amounts of such lower boiling impurity at a higher pressure; cooling the feed stream to a low temperature below −180° C. by heat exchange with at least a first colder fluid in a heat exchange zone; providing a substantially subcooled wash liquid at about said low temperature and said working pressure, such liquid having a vapor pressure less than approximately one five-hundredths of the vapor pressure of nitrogen at such temperature; washing the cold gaseous feed stream with the wash liquid thereby transferring substantially all of the nitrogen lower boiling impurity to the wash liquid by absorption therein; recovering a product-gas effluent from the washing step; passing at least most of such product-gas in heat exchange with the feed gas stream as said first colder fluid; removing the lower boiling impurity from the contaminated wash liquid and recycling such cleaned wash liquid for re-use in the washing step.

7. A process for the low-temperature separation of nitrogen lower boiling impurity from a gas mixture having a major constituent boiling below about −245° C. including the steps of providing a feed stream including the major constituent and containing minor amounts of such lower boiling impurity at a higher pressure; cooling the feed stream to a low temperature below −180° C. by heat exchange with at least a first colder fluid in a heat exchange zone; providing a substantially sub-cooled wash liquid at about said low temperature and said higher pressure, such liquid having a vapor pressure less than approximately one five-hundredths of the vapor pressure of the nitrogen at such temperature; washing the cold gaseous feed stream with the wash liquid thereby transferring substantially all of the nitrogen lower boiling impurity to the wash liquid by absorption therein; recovering a gaseous product effluent from the washing step; passing at least most of such gaseous product in heat exchange with the gaseous feed stream as said first colder fluid; warming and throttling the lower boiling impurity-containing wash liquid to a lower pressure so as to evaporate and substantially desorb such impurity therefrom; recooling the cleaned wash liquid to about said low temperature and recycling such wash liquid for re-use in the washing step.

8. A process for the low-temperature separation of nitrogen lower boiling impurity from gas mixture having a major constituent boiling below about −245° C. including the steps of providing a feed stream including the major constituent and containing minor amounts of such lower boiling impurity at a higher pressure; cooling the feed stream to a low temperature below −180° C. by heat exchange with at least a first colder fluid in a heat exchange zone; providing a substantially subcooled wash liquid at about said low temperature and said higher pressure, such liquid having a vapor pressure less than approximately one five-hundredths of the vapor pressure of nitrogen at such temperature; washing the cold gaseous feed stream with the wash liquid thereby transferring substantially all of the nitrogen lower boiling impurity to the wash liquid by absorption therein; recovering a gaseous product effluent from the washing step; passing at least most of such gaseous product in heat exchange with the gaseous feed stream as said first colder fluid; warming and throttling the lower boiling impurity-containing wash liquid to a lower pressure so as to evaporate and substantially desorb such impurity therefrom; diverting a portion of said gaseous product effluent recovered from the washing step, and contacting such diverted portion with the warmed and throttled wash liquid so as to strip substantially all of the remaining lower boiling impurity therefrom; recooling the cleaned wash liquid to about said low temperature and recycling such wash liquid for re-use in the washing step.

9. A process according to claim 7 for the low-temperature separation of nitrogen lower boiling impurity from a gas mixture having a major constituent boiling below about −245° C. in which refrigeration is recovered from the stream of the lower boiling impurity desorbed from the warmed wash liquid by passing such stream in heat exchange with the gaseous feed stream in said heat exchange zone.

10. A process for the low-temperature separation of nitrogen lower boiling impurity from a gas mixture having a major constituent boiling below about −245° C. including the steps of providing a feed stream including the major constituent and containing minor amounts of such lower boiling impurity at a higher pressure; cooling the feed stream to a low temperature below −180° C. by heat exchange with at least a first colder fluid in a heat exchange zone; providing a substantially subcooled wash liquid at about said low temperature and said higher pressure, such liquid having a vapor pressure less than approximately one five-hundredths of the vapor pressure of nitrogen at such temperature; washing the cold gaseous feed stream with the wash liquid thereby transferring substantially all of the nitrogen lower boiling impurity to the wash liquid by absorption therein; recovering a product gas effluent from the washing step; passing at least most of such product gas in heat exchange with the feed gas stream as said first colder fluid; warming and throttling the lower boiling impurity-containing wash liquid to a lower pressure so as to evaporate and substantially desorb such impurities therefrom; recooling the cleaned wash liquid by heat exchange with the subcooled impurity-containing wash liquid; and recycling such recooled and cleaned wash liquid for re-use in the washing step.

11. A process according to claim 6 for the low-temperature separation of nitrogen lower boiling impurity from a gas mixture having a major constituent boiling below about −245° C. in which the washed product gas effluent is expanded to a lower pressure with the production of external work, and then passed to said heat exchange zone as said first colder fluid.

12. A process according to claim 6 for the low-temperature separation of nitrogen lower boiling impurity from a gas mixture having a major constituent boiling below about −245° C. in which the washed product gas effluent is expanded to a lower pressure with the production of external work, heat exchanged with the recycling cleaned wash liquid thereby recooling such liquid, and then passed to said heat exchange zone as said first colder fluid.

13. A process according to claim 6 for the low-temperature separation of nitrogen lower boiling impurity from a gas mixture having a major constituent boiling below about −245° C. in which an auxiliary stream of the major gaseous feed stream is provided, partially cooled by heat exchange passage with the subcooled impurity-containing wash liquid, and then mixed with the cooling feed stream at an intermediate temperature level in said heat exchange zone.

14. A process according to claim 7 for the low-temperature separation of nitrogen lower boiling impurity from a gas mixture having a major constituent boiling below about −245° C. in which a liquid refrigerant stream is provided which is passed in heat exchange with the recycling cleaned wash liquid to simultaneously recool such wash liquid and vaporize such liquid refrigerant, and then passed in heat exchange with the gaseous feed stream in said heat exchange zone so as to aid in cooling such feed stream.

15. A process according to claim 14 for the low-temperature separation of nitrogen lower boiling impurity from a gas mixture having a major constituent boiling below about −245° C. in which said liquid refrigerant is nitrogen.

16. A process according to claim 7 for the low-temperature separation of nitrogen lower boiling impurity from a gas mixture having a major constituent boiling below about −245° C. in which a refrigerant is provided in a closed refrigeration circuit whereby the recycling cleaned wash liquid is recooled by heat exchange with low pressure liquid refrigerant which is simultaneously vaporized and subsequently rewarmed, recompressed to a second higher pressure, partially recooled by the vaporized low pressure refrigerant in the rewarming step, further recooled by heat exchange with the impurity-containing subcooled wash liquid, and throttled to provide said low pressure liquid refrigerant.

17. A process according to claim 16 for the low-temperature separation of nitrogen lower boiling impurity from a gas mixture having a major constituent boiling below about −245° C. in which said refrigerant is nitrogen.

18. A process according to claim 1 for the low-temperature separation of nitrogen lower boiling impurity from a gas mixture having a major constituent boiling below about −245° C. in which the wash liquid comprises at least one aliphatic hydrocarbon.

19. A process according to claim 1 for the low-temperature separation of nitrogen lower boiling impurity from a gas mixture having a major constituent boiling below about −245° C. in which the wash liquid is a mixture of propane and propylene having a freezing point below −187° C.

20. A process according to claim 1 for the low-temperature separation of nitrogen lower boiling impurity from a gas mixture having a major constituent boiling below about −245° C. in which the wash liquid is a mixture of propane and ethane having a freezing point below −187° C.

21. A process according to claim 1 for the low-temperature separation of nitrogen lower boiling impurity from a gas mixture having a major constituent boiling below about −245° C. in which the wash liquid is a mixture of propylene and ethane having a freezing point below −185° C.

22. A process according to claim 1 for the low-temperature separation of nitrogen lower boiling impurity from a gas mixture having a major constituent boiling below about −245° C. in which the wash liquid is a mixture of ethylene and ethane having a freezing point below −180° C.

23. Apparatus for the low-temperature separation of nitrogen lower boiling impurity from a gas mixture having a major constituent boiling below about −245° C. including means by which a feed stream including the major constituent and containing minor amounts of such lower boiling impurity is provided at a higher pressure below 600 p.s.i.g. and a low temperature below −180° C.; means for washing the feed stream at about said low temperature and said higher pressure with a substantially sub-cooled wash liquid having a vapor pressure less than approximately one five-hundredths of the vapor pressure of nitrogen at the washing temperature and pressure, thereby transferring substantially all of the nitrogen lower boiling impurity to the wash liquid by absorption therein; means for removing the lower boiling impurity from the contaminated wash liquid; and means for recycling the cleaned wash liquid for re-use in said washing means.

24. Apparatus for the low-temperature separation of nitrogen lower boiling impurity from a gas mixture having a major constituent boiling below about −245° C. including means by which a gaseous feed stream including the main constituent and containing minor amounts of such lower boiling impurity is provided at a higher pressure below 600 p.s.i.g.; a heat exchange zone for cooling said feed stream to a low temperature below −180° C.; means for washing the cooled feed stream at about said low temperature and said higher pressure with a substantially subcooled wash liquid having a vapor pressure less than approximately one five-hundredths of the vapor pressure of nitrogen at the washing temperature and washing pressure, thereby transferring substantially all of the nitrogen lower boiling impurity to the wash liquid by absorption therein; means for recovering a product gas effluent from the washing means; means for passing at least part of such product gas through said heat exchange zone to cool the gaseous feed stream; means for warming and throttling the lower boiling impurity containing wash liquid to a lower pressure so as to evaporate and substantially desorb such impurity therefrom; means for separating the evaporated lower boiling impurity from the warmed and throttled wash liquid; means for recooling the cleaned wash liquid to about said low temperature; and means for recycling the cleaned wash liquid for re-use in said washing means.

25. Apparatus for the low-temperature separation of nitrogen lower boiling impurity from a gas mixture having a major constituent boiling below about −245° C. including means by which a feed stream including the major constituent and containing minor amounts of such lower boiling impurity is provided at a higher pressure; a heat exchange zone for cooling said feed stream to a low temperature below −180° C.; means for washing the cooled feed stream at about said low temperature and said higher pressure with a substantially subcooled wash liquid having a vapor pressure less than approximately one five-hundredths of the vapor pressure of nitrogen at the washing temperature and washing pressure, thereby transferring substantially all of the nitrogen lower boiling impurity to the wash liquid by absorption therein; means for recovering a product gas effluent from the washing means; means for passing at least part of such product gas through said heat exchange zone to cool the product gas feed stream; means for warming and throttling the lower boiling impurity containing wash liquid to a lower pressure so as to evaporate and substantially desorb such impurity therefrom; means for separating the evaporated lower boiling impurity from the warmed and throttled wash liquid; means for passing the cleaned wash liquid in heat exchange with the subcooled lower boiling impurity-containing wash liquid so as to simultaneously recool the cleaned wash liquid and rewarm the impurity-containing wash liquid; and means for recycling the recooled and cleaned wash liquid for re-use in said washing means.

26. Apparatus for the low-temperature separation of nitrogen lower boiling impurity from a gas mixture having a major constituent boiling below about −245° C. according to claim 24, including means comprising a work expander for expanding at least part of the product gas effluent from said higher pressure to a lower pressure with the production of external work, prior to passage of such product effluent through said heat exchange zone to cool the gaseous feed stream.

References Cited in the file of this patent
UNITED STATES PATENTS

| | | |
|---|---|---|
| 1,773,012 | Schuftan | Aug. 12, 1930 |
| 1,942,131 | Baumann | Jan. 2, 1934 |
| 2,815,650 | McIntire | Dec. 10, 1957 |
| 2,826,266 | Hachmuth | Mar. 11, 1958 |
| 2,870,868 | Du Bois Eastman | Jan. 27, 1959 |
| 2,880,591 | Kwauk | Apr. 7, 1959 |
| 2,887,850 | Adams | May 26, 1959 |
| 2,956,410 | Palazzo | Oct. 18, 1960 |